Feb. 16, 1937.  E. B. BROOKE  2,070,579

PLUMBER'S PLUG

Filed Feb. 3, 1936

INVENTOR
Edward B. Brooke.

BY
Johnston & Jennings
ATTORNEYS

Patented Feb. 16, 1937

2,070,579

UNITED STATES PATENT OFFICE 2,070,579

PLUMBER'S PLUG

Edward B. Brooke, Birmingham, Ala.

Application February 3, 1936, Serial No. 62,021

9 Claims. (Cl. 220—24)

My invention relates to means for stopping leaks in pressure containers, such as pipe lines, boilers and tanks. The principal object of the invention is to provide a plug which may be applied in a minimum of time and which will effectively stop a leak. A further object is the provision of a plug which has sufficient tenacity to withstand the shearing forces incident to its application, and which will flow under compression so as effectively to fill all of the depressions and inequalities in the opening to be plugged, and withstand high pressure. A still further object of the invention is to provide a plug of the character described which shall make good electrical contact with the opening and provide a means for grounding the object to which it is applied to minimize corrosion by electrolysis.

A still further object of my invention is the provision, in a plug for stopping leaks, of a reinforced metallic bushing made of two metals, one of which is adapted to withstand the shearing forces incident to the application of the plug, and the other of which has the property of flowing under compression to fill all inequalities in the opening to be plugged.

A still further object of my invention is to provide a means for making a service connection to a pressure container which may be readily applied in a minimum of time, and which, when applied, shall form a rigid pressure tight connection with the container.

Briefly, my invention is a plug comprising an expansible bushing composed of two metals, one a reinforcing member of ductile material having a relatively high tenacity so as to resist the shearing force exerted when expanded into a hole to be stopped, and the other metal surrounding the reinforcing member being soft and having the property of flowing under compression. The bushing is expanded by means of a bolt extending through it having a conical head for expanding the bushing from inside the opening, and a nut for drawing the conical head inwardly of the bushing to expand it.

The reinforcing member should be of a metal or an alloy having the properties of ductility and tenacity on the order of copper, aluminum, soft steel, Monel metal or the like, while the soft metal or alloy surrounding the reinforcing member should have the properties of deformation and flowing under pressure on the order of lead.

While expanded lead bushings have heretofore been employed in stopping leaks and plugging holes in metal containers, their use has been greatly restricted due to the fact that they must be expanded from within the container and when subjected to sufficient expanding force to fill the voids and inequalities about the hole and withstand pressure, the lead would shear at the edge of the hole, causing the plug to be blown out by the pressure within the container. I have also experimented with copper alone as the expansible bushing, but its lack of the property of flowing under pressure, resulted in the bushing being expanded to form pressure tight contact only around the edge of a smooth opening. In such case the slightest corrosion would again start a leak. Where the edge of the opening was burred or uneven, as is more often the case, the copper sleeve would fail to make pressure tight contact even around the edge.

By employing a copper sleeve as a reinforcing member and surrounding the same with lead, when the copper sleeve is expanded, the layer of lead around the expanded portion of the sleeve flows into all depressions and uneven places and also completely fills the space between the bolt and the sleeve, even flowing into and filling the threads of the bolt. The result is an extremely tight permanent stopping of the opening.

My improved plug may also be employed as means to minimize corrosion in underground pipe lines. It is now the consensus of opinion that a great deal of corrosion is caused by electrolysis where pipes pass through damp or acid soil. Where my improved plug is employed under such conditions, I connect to it a bare copper wire which is laid in the soil for a suitable distance to ground the pipe effectively. Inasmuch as the plug has excellent electrical contact with the walls of the pipe, stray electrical currents passing through the pipe are passed into the ground, without causing the pipe to pit and corrode.

Devices embodying features of my invention are illustrated in the accompanying drawing forming a part of this application, in which Fig. 1 is a view in elevation showing my improved plug in position to be installed in an opening in a pressure container, a fragment of the latter being shown in section;

Figure 1:
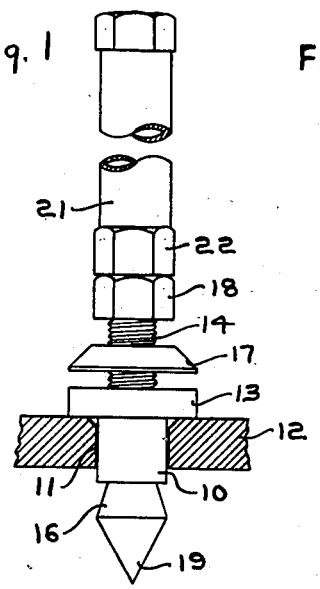

Referring to the drawing for a better understanding of my invention, my improved plug comprises a bushing 10 which fits loosely into an opening 11 in the wall 12 of the container to which it is applied. The bushing 10 has a flange 13 which surrounds the opening 11 on the outside of the container. Passing through the bushing 10 is a bolt 14 having a conical head 16. A washer 17 is interposed between the flange 13 of the bushing 10, and a jack nut 18 which serves to draw the bolt 14 upwardly through the bushing 10 and expand it against the walls of the opening. The bolt 14 is preferably pointed on its inner end, as at 19, in order to facilitate entering the bolt in relatively inaccessible places and against pressure.

As a means for readily applying the device, a short piece of pipe 21 is internally threaded to screw on to the upper end (as shown in the drawing) of the bolt 14. A lock nut 22 may be employed to tighten the piece of pipe 21 on to the bolt 14 to prevent its becoming disengaged and dropping. As shown, if the bushing 10 makes a rather snug fit with the opening 11, the pipe 21 may be struck with a hammer or other suitable tool to drive it in place before tightening the jack nut 18. The jack nut 18 is then tightened to expand the bushing 10 against the walls of the opening.

Figure 3:
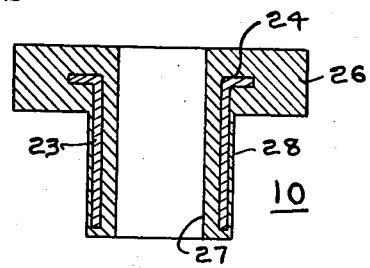
Fig. 3 is a sectional view of the reinforced bushing employed in my improved plug.

Referring now particularly to Fig. 3 of the drawing, it will be seen that my improved bushing 10 consists of a reinforcing sleeve 23 which is preferably made of copper or other metal or alloy having similar properties of ductility and tenacity. The reinforcing sleeve 23 is also preferably provided with a small outer flange 24 to reinforce the flange 13. In making the bushing 10 the reinforcing sleeve is tinned, placed in a mold, and lead, or other metal or alloy having similar properties of deformation and flow under compression, is cast around the sleeve to form a heavy outer flange 26 and relatively thin inner and outer walls 27 and 28 for the cylindrical portion of the bushing.

Figure 2:
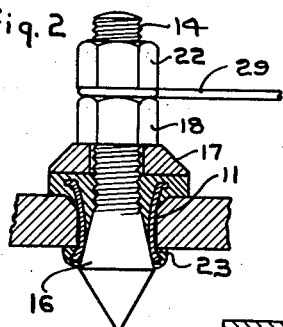
Fig. 2 is a sectional view showing my improved plug in place with ground wire attached.

When the jack nut 18 is tightened down, drawing the conical portion 16 of the bolt 14 inwardly of the sleeve, the reinforcing member 23, as shown in Fig. 2, is expanded outwardly into virtual contact with the side of the opening 11, there being only a very thin layer of lead between the reinforcing member and the wall of the opening. Also, as will be seen from Fig. 2, the outer end of the bushing is likewise expanded by the flow of the lead under compression, and the lead flows inwardly of the bushing to completely fill the space around the bolt, and flows into the threads of the bolt. The property of deformation and flow under compression of the lead also causes it to fill up completely all inequalities in the opening and thereby effectively stop any leak through the opening. The tenacity of the copper or similar metal of which the reinforcing sleeve is made is such as to prevent shearing of the plug at the edge of the opening 11 when the jack nut 18 is tightened.

The components of the parts of the plug are preferably made of good electrical conducting, corrosion resisting material. The bolt 14 may be made of Tobin or phosphor bronze, which is very tough and has a relatively high tensile strength. The washer 17 and nut 18 may be made of turning brass. As shown in Fig. 2, a ground connection 29 may be connected to the outer end of the bolt 14 by means of the lock nut 22 to minimize corrosion, as already explained.

Figure 4:
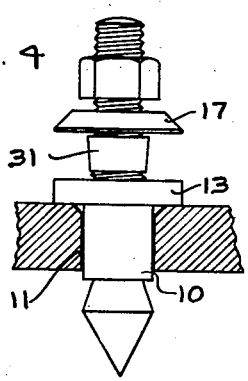
Fig. 4 is a view similar to Fig. 1, showing a modified form of my invention, in which an expander is employed both on the inside and outside of the opening.
Figure 5:
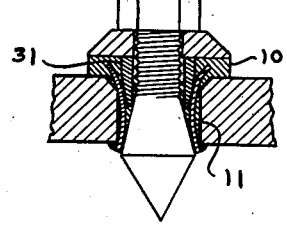
Fig. 5 is a sectional view of the modification shown in Fig. 4 in place.

Referring now to Fig. 4, I show a modified form of my invention which is designed for stopping leaks in relatively thicker wall containers. In accordance with this modification, I employ a conical bushing 31 between the washer 17 and the bushing 10, which serves better to expand the outer end of the bushing 10 and the reinforcing sleeve 24. As shown in Fig. 5, the conical bushing 31 is forced inwardly of the bushing 10 and spreads it outwardly into contact with the walls of the opening 11. At the same time the soft metal flows into all the openings around the bolt and bushing. This form of my invention is especially adapted for stopping leaks in the walls of cast iron pipe, holes drilled in such metal being usually more irregular than those made in other metals.

Figure 6:
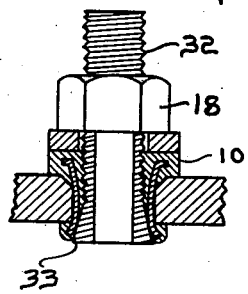
Fig. 6 is a sectional view showing a service connection for a pressure container, in which my improved reinforced bushing is employed.

Referring to Fig. 6 of the drawing, I show a means for making a service connection to a pressure container. In accordance with this modification, instead of the bolt 14, I employ a tubular connector 32, which tubular connector has a conical shaped inner end 33 which acts, as does the conical head 16 of the bolt 14, to spread the bushing 10 and fill the opening. A connection may be made to the outer end of the tubular member 32 in any well known manner.

In applying my improved plug, the leak to be stopped or opening in the side of the container is made by drilling, or with a suitable drift punch to the proper size to permit the ready insertion of the cylindrical portion of the bushing 10. The device is then assembled, as shown in Fig. 1, and inserted in the opening and the jack nut 18 drawn up to expand the bushing as described. The lock nut 22 may be employed to prevent loosening of the jack nut 18, but even if the latter should become loose the plug would be held in place by reason of the pressure within the container and the fact that the soft metal has flowed into the threads of the bolt 18.

While I have described my improved expansible bushing as preferably being made of lead with a reinforcing sleeve made of copper embedded in the lead, it is to be understood that other metals or alloys, many of which will suggest themselves to those skilled in the art, and having the requisite properties, may be employed and are within the purview of my invention, and the intended scope of the appended claims.

From the foregoing it will be apparent that I have devised an improved plug for stopping leaks in pressure containers which is extremely simple, strong enough to withstand the shearing forces encountered in its application, and which has the property of flowing under compression to an extent to fill completely the inequalities in the opening.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A plug of the character described comprising a bushing composed of a ductile metal having a tenacity on the order of lead and a cylindrical reinforcing member embedded in the bushing made of a ductile metal having a tenacity on the order of copper, a bolt having a flared expanding head fitting in the bushing and a nut for drawing the flared head inwardly of the bushing.

2. A plug of the character described comprising a bushing made of lead, a reinforcing sleeve embedded in the lead, a bolt extending through the bushing having a flared expanding head, and a nut for drawing the flared head inwardly of the bushing.

3. A plug adapted for fitting in an opening in a pressure container, comprising a lead bushing for insertion in the opening and having an external flange bearing around the edge of the opening, a copper reinforcing sleeve substantially coextensive with the bushing embedded therein, a bolt having a conical expanding head extending through the bushing, and a nut for drawing the conical head inwardly of the bushing to expand it to fit tightly in the opening.

4. A plug for expanding in an opening in a pressure container comprising a bushing made of metal adapted to be deformed and flow under compression fitting in the opening, a cylindrical metal reinforcing member embedded in the bushing substantially coextensive therewith, a threaded member having a conical expanding head smaller in diameter than the opening extending through the bushing, and a nut for drawing the conical head inwardly of the bushing.

5. A plug for expanding in an opening in a pressure container comprising a lead bushing fitting in the opening, a cylindrical copper reinforcing member embedded in the bushing substantially coextensive therewith, a bolt having a flared expanding head extending through the bushing, a nut for drawing the flared head inwardly of the bushing, and a ground wire connected to the outer end of the bolt.

6. A plug for expanding in an opening in a pressure container comprising a lead bushing fitting in the opening, a cylindrical copper reinforcing member embedded in the bushing substantially coextensive therewith, a bolt having a conical expanding head extending through the bushing, a conical expanding member surrounding the bolt on the opposite side of the bushing from the conical head, and a nut for forcing both the expanding member and expanding head inwardly of the bushing.

7. A device for making a service connection to a pressure container, a lead bushing, a copper cylindrical reinforcing member embedded in the bushing, a threaded tube having a conically expanded end extending through the bushing, and a nut for drawing the conically expanded head inwardly of the bushing.

8. A device of the character described comprising a bushing made of metal adapted to be deformed and flow under compression, an aluminum cylindrical reinforcing member embedded in the bushing, a threaded member extending through the bushing, a conical shaped head on the threaded member for expanding the bushing, and a nut for drawing the threaded member into the bushing.

9. A device of the character described comprising a bushing made of metal adapted to be deformed and flow under compression, a soft steel cylindrical reinforcing member embedded in the bushing, a threaded member extending through the bushing, a conical shaped head on the threaded member for expanding the bushing, and a nut for drawing the threaded member into the bushing.

EDWARD B. BROOKE.